United States Patent
Von Wendorff

(10) Patent No.: US 6,807,514 B2
(45) Date of Patent: Oct. 19, 2004

(54) APPARATUS FOR MONITORING THE PROPER OPERATION OF COMPONENTS OF AN ELECTRICAL SYSTEM CARRYING OUT THE SAME OR MUTUALLY CORRESPONDING ACTIONS

(75) Inventor: Wilhard Von Wendorff, München (DE)

(73) Assignee: Infineon Technologies AG, Munich (DE)

( * ) Notice: Subject to any disclaimer, the term of this patent is extended or adjusted under 35 U.S.C. 154(b) by 158 days.

(21) Appl. No.: 09/918,423

(22) Filed: Jul. 27, 2001

(65) Prior Publication Data

US 2002/0046007 A1 Apr. 18, 2002

(30) Foreign Application Priority Data

Jul. 27, 2000 (DE) .......................................... 100 36 598

(51) Int. Cl.[7] .................................................. G06F 11/00
(52) U.S. Cl. .......................................... 702/188; 701/34
(58) Field of Search ............................... 702/57–59, 64, 702/65, 81, 82, 89, 90, 116, 117, 183–186, 188–193; 714/11, 14, 24, 820; 710/14, 45; 700/79; 370/276; 701/34; 340/508

(56) References Cited

U.S. PATENT DOCUMENTS

| | | | | |
|---|---|---|---|---|
| 3,898,621 A | * | 8/1975 | Zelinski et al. .......... | 714/11 |
| 4,078,259 A | * | 3/1978 | Soulsby et al. .......... | 710/15 |
| 4,414,540 A | * | 11/1983 | Dickenson .............. | 340/508 |
| 4,639,864 A | * | 1/1987 | Katzman et al. ......... | 714/14 |
| 4,648,064 A | * | 3/1987 | Morley ................. | 710/45 |
| 4,672,537 A | * | 6/1987 | Katzman et al. ......... | 714/56 |
| 4,733,393 A | * | 3/1988 | Morton ................. | 714/25 |
| 4,745,542 A | * | 5/1988 | Baba et al. ............ | 700/79 |
| 4,908,822 A | * | 3/1990 | Wroblewski ............ | 370/276 |
| 5,291,494 A | * | 3/1994 | Bruckert et al. ........ | 714/24 |
| 5,303,143 A | | 4/1994 | Sommer et al. | |
| 5,526,264 A | * | 6/1996 | Niggemann et al. ...... | 701/76 |
| 5,754,963 A | * | 5/1998 | Nunneley et al. ....... | 701/34 |
| 5,764,660 A | * | 6/1998 | Mohat ................. | 714/820 |
| 5,784,547 A | * | 7/1998 | Dittmar et al. ......... | 714/4 |
| 5,790,419 A | * | 8/1998 | Matsuda et al. ........ | 700/79 |
| 6,167,329 A | * | 12/2000 | Engel et al. .......... | 361/93.2 |

FOREIGN PATENT DOCUMENTS

| | | |
|---|---|---|
| DE | 39 01 803 C1 | 3/1990 |
| DE | 40 41 062 A1 | 7/1992 |
| DE | 41 12 626 A1 | 10/1992 |
| DE | 41 22 016 C2 | 1/1993 |
| DE | 42 25 834 A1 | 2/1994 |
| DE | 44 08 603 A1 | 9/1995 |
| DE | 199 29 804 A1 | 1/2000 |

* cited by examiner

*Primary Examiner*—Marc S. Hoff
*Assistant Examiner*—Mohamed Charioui
(74) *Attorney, Agent, or Firm*—Laurence A. Greenberg; Werner H. Stemer; Gregory L. Mayback

(57) ABSTRACT

The apparatus monitors several system components for proper operation. Each of the system components to be monitored is assigned at least one dedicated monitoring device that can be operated independently of the system components to be monitored. Under all circumstances it is possible to detect reliably whether, and if appropriate, which of the system components to be monitored is operating in a faulty manner.

17 Claims, 2 Drawing Sheets

APPARATUS FOR MONITORING THE PROPER OPERATION OF COMPONENTS OF AN ELECTRICAL SYSTEM CARRYING OUT THE SAME OR MUTUALLY CORRESPONDING ACTIONS

BACKGROUND OF THE INVENTION

Field of the Invention

The present invention relates to an apparatus for monitoring the proper operation of components of an electrical system that carry out the same or mutually corresponding actions.

Systems which have a plurality of components that carry out the same or mutually corresponding actions are, in particular, failsafe systems or fault-tolerant systems.

The system components that carry out the same or mutually corresponding actions and which, in the simplest case, are identically constructed and identically operated system components (for example identically constructed and identically operated microprocessors or microcontrollers), make it possible to detect faults which occur in the system components and to react to them in such a way that the system can continue to operate without faults or is deactivated.

The check as to whether a fault has occurred in one of the plurality of system components that carry out the same or mutually corresponding actions is generally carried out by a check being made as to whether these system components supply identical or mutually corresponding results or intermediate results.

This check can be carried out with monitoring devices integrated into the system components to be checked; or with a common monitoring device for all the system components, whereby the common device is provided outside the system components to be checked.

When one of the monitoring devices determines that the data to be compared with one another (selected results or intermediate results from the system components to be monitored, or data representing these) differ from one another or do not correspond with one another, the faulty system component is deactivated and, if appropriate, replaced by one of the other system components (in the case of fault-tolerant systems); or the entire system is deactivated (in the case of failsafe systems).

As a result, it is possible to avoid a fault in one of the system components leading to a failure of the system and/or threatening the safety of the system.

However, experience shows that this is not ensured reliably under all conditions.

SUMMARY OF THE INVENTION

The object of the present invention is to provide an apparatus of monitoring the proper functioning of the components of an electrical system which overcomes the above-noted deficiencies and disadvantages of the prior art devices and methods of this general kind, and which enables reliable detection, under all circumstances, whether and if appropriate which system component is operating in a faulty manner.

With the above and other objects in view there is provided, in accordance with the invention, in an electrical system with a plurality of system components carrying out the same or mutually corresponding actions, an apparatus for monitoring a proper operation of the plurality of components of the electrical system. The apparatus comprises a plurality of dedicated monitoring devices each assigned to a respective one of the system components to be monitored, each of the dedicated monitoring devices being operable independently of the respective system component to be monitored.

In other words, the apparatus according to the invention is distinguished by the fact that each of the system components to be monitored is assigned at least one dedicated monitoring device that can be operated independently of the system components to be monitored.

The fact that a large number of monitoring devices is provided to monitor the system components to be monitored means that—as distinct from the provision of only a single, common monitoring device for all system components—it cannot occur, or at least not automatically, that a malfunction of a monitoring device results in complete failure of the system or of the monitoring.

The fact that the monitoring devices can be operated independently of the system components to be monitored means that—as distinct from the integration of the monitoring devices into the system components to be monitored—it cannot occur, or in any case not automatically, that a fault in a system component to be monitored simultaneously results in a malfunction of the associated monitoring device.

In accordance with an added feature of the invention, the monitoring devices are connected to receive monitoring data from the respectively associated system component and are configured to compare monitoring data received from the respectively associated system component and from other system components or from other monitoring devices, for determining whether or not the respectively associated system component is operating properly.

In accordance with an additional feature of the invention, the monitoring devices examine the monitoring data received from the system components and to decide whether the monitoring data meet predefined conditions.

In accordance with another feature of the invention, the monitoring devices check whether the monitoring data received from the system components to be monitored and/or from the monitoring devices associated therewith agree or correspond to one another.

In accordance with a further feature of the invention, the monitoring devices check whether the monitoring data received from the system components to be monitored and/or from the monitoring devices associated therewith are in a predetermined ratio or a predetermined relationship with one another.

In accordance with again an added feature of the invention, the monitoring devices check whether the monitoring data received from the system components to be monitored and/or from the monitoring devices associated therewith are predetermined data.

In accordance with again an additional feature of the invention, if a given monitoring device concludes that the monitoring data from one of the system components do not meet the predefined condition, the relevant system component is made to stop operating. In accordance with again another feature of the invention, the respective monitoring device is configured to stop an operation of the relevant system component.

In accordance with a specific embodiment of the invention, the system components to be monitored are constructed and operated to only process a given task when an enable signal is present. That is, the system components to be monitored are constructed and operated in such a way that they only fulfill or continue the task which they are actually obliged to carry out when an enable signal is fed to them.

In accordance with a preferred embodiment of the invention, the enable signal is generated by the monitoring device associated with the system component to be monitored.

In accordance with again a further feature of the invention, the enable signal is formed by a logical combination of control signals which are generated and output by the monitoring devices associated with a respective system component depending on whether the monitoring data output by the system component meet the predefined conditions or not.

In accordance with yet an added feature of the invention, the system components to be monitored are program-controlled units.

In accordance with yet an additional feature of the invention, the system components to be monitored are a constituent part of various bus units of a bus system. Specifically, the monitoring devices are a constituent part of the communications controllers of the bus units, by means of which data to be transmitted to other bus units are output on the bus, and by means of which data transmitted to the relevant bus unit via the bus are accepted.

In accordance with yet again an additional feature of the invention, the bus units containing the system components to be monitored are connected to one another via a plurality of buses. In accordance with a specific feature of the invention, the bus units contain a number of communications controllers corresponding to the number of buses via which they are connected to one another, each communications controller being connected to a different bus.

In accordance with a concomitant feature of the invention, a monitoring device is provided in each of the communications controllers.

In summary, with the novel apparatus it is therefore possible to detect reliably, under all circumstances, whether and, if appropriate, which of the system components to be monitored is operating in a faulty manner.

Other features which are considered as characteristic for the invention are set forth in the appended claims.

Although the invention is illustrated and described herein as embodied in an arrangement for monitoring the proper operation of components of an electrical system that carry out the same or mutually corresponding actions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The arrangement described below is intended, in the example considered, to ensure the proper function of an antilock braking system in a motor vehicle. More precisely, it is intended to monitor whether components of the antilock braking system that carry out equal or mutually corresponding actions are actually carrying out or will carry out the same or mutually corresponding actions.

The components that carry out the same or mutually corresponding actions are, in particular, identically constructed and identically operated system components, or system components which, although not identically constructed and/or identically operated, supply the same or mutually corresponding results or intermediate results, or system components which, although they do not supply the same or mutually corresponding results or intermediate results, develop the same or mutually corresponding effects.

The apparatus described herein is distinguished by the fact that each of the system components to be monitored is assigned at least one dedicated monitoring device that can be operated independently of the system components to be monitored. The monitoring devices receive suitable monitoring data from the system components to be monitored in order to check proper operation, check whether these monitoring data satisfy predefined conditions, on the basis of the result of the check, define whether and if appropriate which of the system components to be monitored are operating in a faulty manner, and ensure that the faulty system components or the entire system no longer continue to operate, if a fault has been detected.

Figure 1:
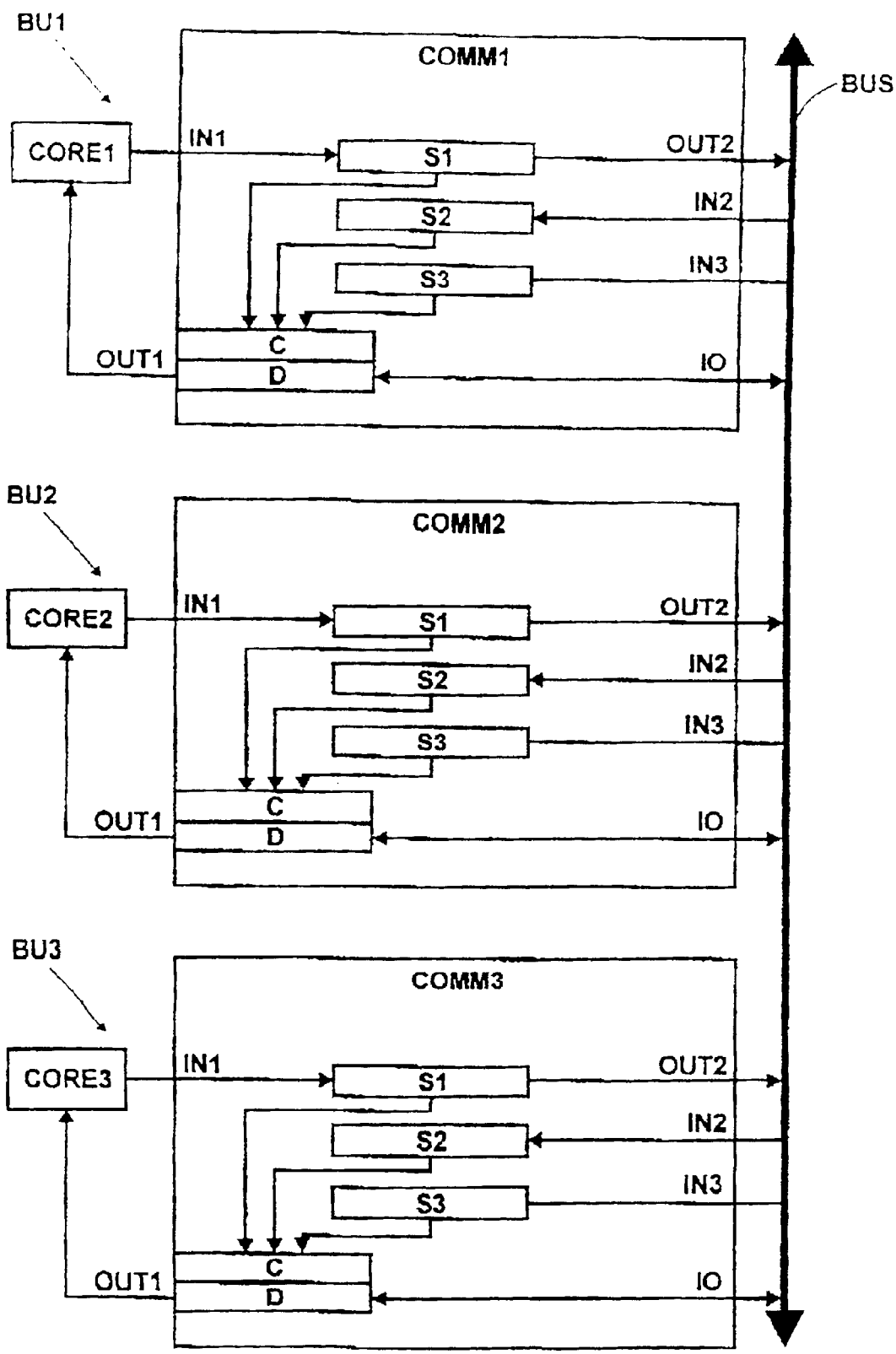
FIG. 1 is a block diagram showing a system with a first exemplary embodiment of the apparatus according to the invention for monitoring the proper operation of components of an electrical system that carry out the same or mutually corresponding actions.

Referring now to the figures of the drawing in detail and first, particularly, to FIG. 1 thereof, there is seen a system wherein each system component to be monitored is assigned a monitoring unit.

The system components to be monitored and the monitoring devices associated with these are, in the example being considered, a constituent part of various units connected to one another via a bus.

The system shown in FIG. 1 comprises a bus BUS and bus units BU1, BU2 and BU3 connected via the bus. Each of the bus units BU1, BU2 and BU3 contain a program-controlled unit designated by the reference symbols CORE1, CORE2 and CORE3, and a communications controller designated by the reference symbols COMM1, COMM2 and COMM3.

For completeness, it should be understood that any desired number of further bus units can be connected to the bus BUS, and the further bus units may have any desired construction and any desired function.

The program-controlled units CORE1, CORE2 and CORE3 are, for example, microprocessors, microcontrollers, or signal processors. These program-controlled units CORE1, CORE2 and CORE3 are identically constructed in the example being considered and are identically operated.

The monitoring devices carrying out the monitoring of the program-controlled units CORE1, CORE2 and CORE3 are a constituent part of the communications controllers COMM1, COMM2 and COMM3. Put more precisely, the monitoring device monitoring the program-controlled unit CORE1 is a constituent part of the communications controller COMM1, the monitoring device monitoring the program-controlled unit CORE2 is a constituent part of the communications controller COMM2, and the monitoring device monitoring the program-controlled unit CORE3 is a constituent part of the communications controller COMM3.

The communications controllers COMM1, COMM2 and COMM3 are used to output data to be transferred to other bus units onto the bus BUS, and to accept data transmitted to the relevant bus unit from other bus units via the bus BUS. In the figures, only the monitoring devices contained in the communications controllers are illustrated. The construction, the function and the mode of action of the actual communications controllers are known and do not require any more detailed explanation.

The communications controllers COMM1, COMM2 and COMM3 each contain a first storage device S1 (memory S1), a second storage device S2 (memory S2), a third storage device S3 (memory S3), a comparison device C (comparator C) and a decision device D (logic unit D), are connected via an input terminal IN1 and an output terminal OUT1 to the associated (located in the same bus unit) program-controlled unit, and are connected via input terminals IN2 and IN3, an output terminal OUT2 and an input and output terminal IO to the bus BUS.

The monitoring device contained in the first communications controller COMM1 receives monitoring data from the program-controlled unit CORE1 associated with it via the input terminal IN1, and stores these data in the first storage device S1, receives monitoring data originating from the second program-controlled unit CORE2 and transmitted via the bus BUS from the second communications controller COMM2, via the input terminal IN2, and stores these data in the second storage device S2, receives monitoring data originating from the third program-controlled unit CORE3 and transmitted via the bus BUS from the third communications controller COMM3, via the input terminal IN3, and stores these data in the third storage device S3, transmits the monitoring data obtained from the program-controlled unit CORE1 associated with it and stored in the first storage device S1, via the output terminal OUT2 and the bus BUS, to the second communications controller COMM2 and to the third communications controller COMM3, checks, by means of the comparison device C, whether the monitoring data stored in the storage devices S1 to S3 meet predefined conditions, decides, by means of the decision device D, on the basis of the result of the comparison carried out by the comparison device C, whether the associated program-controlled unit CORE1 remains operating or may continue to operate or must be deactivated, controls, via the output terminal OUT1, the associated program-controlled unit CORE1 in accordance with the decision made by the decision device D, transmits the decision made by the decision device D, via the input and output terminal IO and the bus BUS, to the second communications controller COMM2 and to the third communications controller COMM3, and receives, via the input and output terminal IO, the decisions which have been made by the decision devices D contained in the communications controllers COMM2 and COMM3 and are transmitted to the first communications controller COMM1 by the communications controllers COMM2 and COMM3.

The monitoring device contained in the second communications controller COMM2 receives monitoring data from the program-controlled unit CORE2 associated with it via the input terminal IN1, and stores these data in the first storage device S1, receives monitoring data originating from the first program-controlled unit CORE1 and transmitted via the bus BUS from the first communications controller COMM1, via the input terminal IN2, and stores these data in the second storage device S2, receives monitoring data originating from the third program-controlled unit CORE3 and transmitted via the bus BUS from the third communications controller COMM3, via the input terminal IN3, and stores these data in the third storage device S3, transmits the monitoring data obtained from the program-controlled unit CORE2 associated with it and stored in the first storage device S1, via the output terminal OUT2 and the bus BUS, to the first communications controller COMM1 and to the third communications controller COMM3, checks, by means of the comparison device C, whether the monitoring data stored in the storage devices S1 to S3 meet predefined conditions, decides, by means of the decision device D, on the basis of the result of the comparison carried out by the comparison device C, whether the associated program-controlled unit CORE2 remains operating or may continue to operate or must be deactivated, controls, via the output terminal OUT1, the associated program-controlled unit CORE1 in accordance with the decision made by the decision device D, transmits the decision made by the decision device D, via the input and output terminal IO and the bus BUS, to the first communications controller COMM1 and to the third communications controller COMM3, and receives, via the input and output terminal IO, the decisions which have been made by the decision devices D contained in the communications controllers COMM1 and COMM3 and are transmitted to the second communications controller COMM2 by the communications controllers COMM1 and COMM3.

The monitoring device contained in the third communications controller COMM3 receives monitoring data from the program-controlled unit CORE3 associated with it via the input terminal IN1, and stores these data in the first storage device S1, receives monitoring data originating from the first program-controlled unit CORE1 and transmitted via the bus BUS from the first communications controller COMM1, via the input terminal IN2, and stores these data in the second storage device S2, receives monitoring data originating from the second program-controlled unit CORE2 and transmitted it via the bus BUS from the second communications controller COMM2, via the input terminal IN3, and stores these data in the third storage device S3, transmits the monitoring data obtained from the program-controlled unit CORE3 associated with it and stored in the first storage device S1, via the output terminal OUT2 and the bus BUS, to the first communications controller COMM1 and to the second communications controller COMM2, checks, by means of the comparison device C, whether the monitoring data stored in the storage devices S1 to S3 meet predefined conditions, decides, by means of the decision device D, on the basis of the result of the comparison carried out by the comparison device C, whether the associated program-controlled unit CORE3 remains operating or may continue to operate or must be deactivated, controls, via the output terminal OUT1, the associated program-controlled unit CORE3 in accordance with the decision made by the decision device D, transmits the decision made by the decision device D, via the input and output terminal IO and the bus BUS, to the first communications controller COMM1 and to the second communications controller COMM2, and receives, via the input and output terminal IO, the decisions which have been made by the decision devices D contained in the communications controllers COMM1 and COMM2 and are transmitted to the third communications controller COMM3 by the communications controllers COMM1 and COMM2.

The monitoring data which the system components to be monitored output to the monitoring devices are data which permit the comparison devices C and the decision devices D to determine whether the system components to be monitored carry out identical or mutually corresponding actions or processes. They are, for example, results or intermediate results from the system components to be monitored, or data which represent these results.

As mentioned above, the comparison devices C check whether the monitoring data from the respectively associated system components to be monitored meet predefined conditions. In the example being considered, this is done by comparing the monitoring data from the system components to be monitored.

The decision devices D use the comparison results to check whether the monitoring data from all the system components to be monitored are identical or correspond to one another.

If the monitoring data from all the system components to be monitored are identical or mutually corresponding monitoring data, then the decision devices D conclude from this that the system components to be monitored carry out identical or mutually corresponding actions and allow the respectively associated system component to continue to operate.

If the control data from the system components to be monitored are not identical or are not mutually corresponding monitoring data, then the decision devices D conclude that one of the system components to be monitored is operating in a faulty manner. In this case, the decision devices determine which of the system components is operating in a faulty manner and they initiate action to prevent the "faulty system component" from continuing to operate.

In the example, this was carried out by the decision devices determining the monitoring data which were output by most system components, establishing that a system component which has output other monitoring data is operating in a faulty manner, and not permitting the associated system component to continue to operate if it has been established that this is operating in a faulty manner (in the case of fault-tolerant systems) or deactivating all the system components if it has been established that one of the system components is operating in a faulty manner (in failsafe systems).

The risk that an existing fault will not be detected or that a fault will be detected which is not present at all (that one of the system components or the entire system may mistakenly continue to operate or is deactivated) is negligibly low.

One of the reasons for this lies in the fact that—as distinct from the provision of only a single monitoring device common to all the system components—it cannot occur, or in any case not automatically, that a monitoring device malfunction results in complete failure of the system or of the monitoring.

A further reason for this lies in the fact that—as distinct from the integration of the monitoring devices in the system components to be monitored—it cannot occur, or in any case not automatically, that a fault in a system component to be monitored simultaneously results in a malfunction of the associated monitoring device.

Added to this is the fact that the decision devices D exchange their results via the I/O terminals of the communications controllers, and therefore even faults within the monitoring devices can be detected.

It becomes extremely advantageous that the system components to be monitored (and the monitoring devices associated with these) are provided in different bus units, that is to say more or less far removed from one another. In this way, it is possible to prevent unfavorable environmental conditions (for example an excessively high temperature, electromagnetic interference, an excessively high or excessively low or fluctuating supply voltage, etc.) in a plurality or all of the system components to be monitored and/or in a plurality or all of the monitoring devices causing the same and therefore possibly not detectable fault.

Even more reliable monitoring of the system components to be monitored results if the system components to be monitored are each assigned a plurality of monitoring devices. As a result, faults occurring in the system components to be monitored and in the monitoring devices associated with these can be detected with even more certainty.

Figure 2:
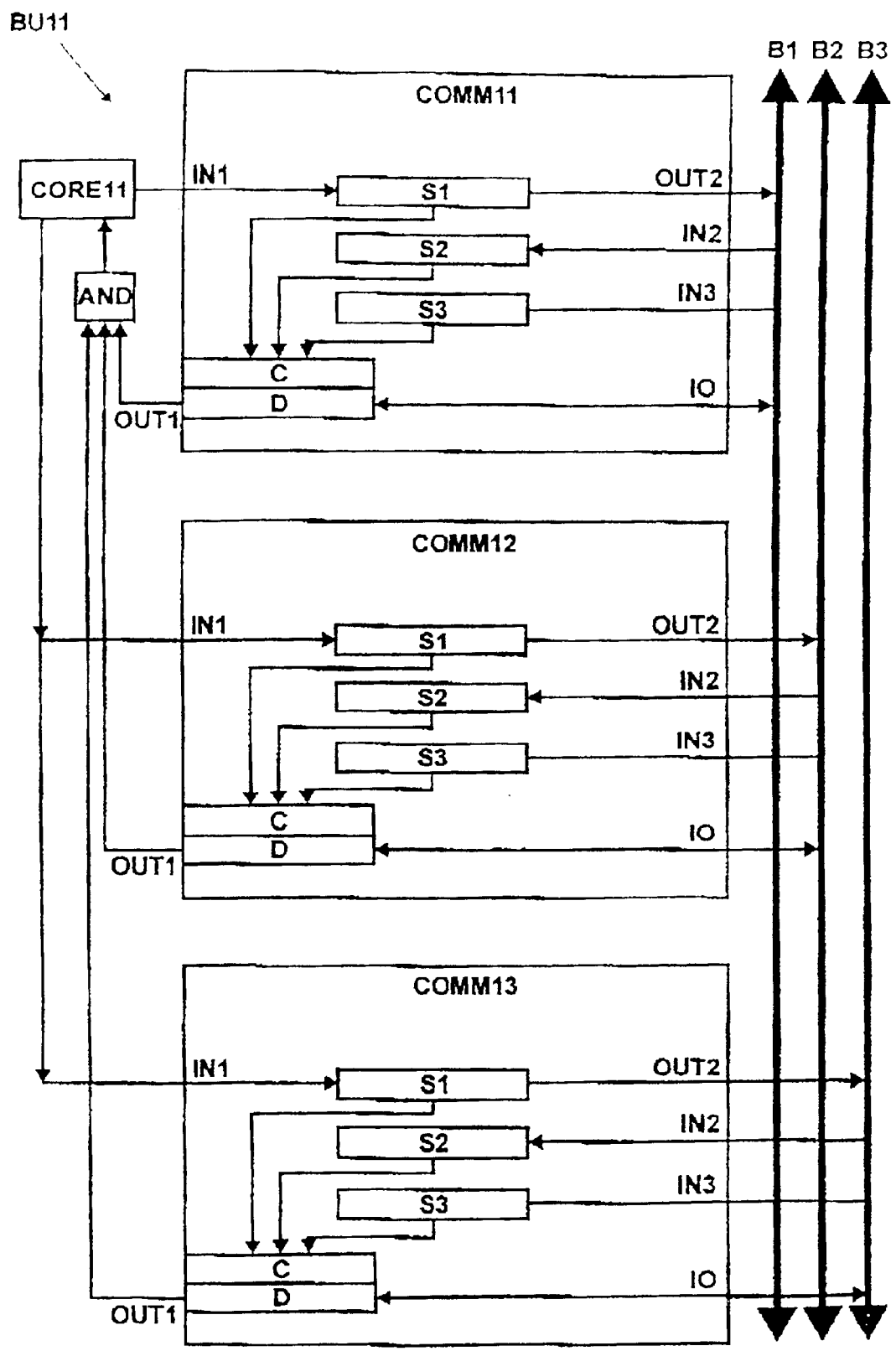
FIG. 2 is a block diagram of a system with a second exemplary embodiment of the apparatus for monitoring the proper operation of components of an electrical system that carry out the same or mutually corresponding actions.

A system wherein the system components to be monitored are each assigned a plurality of dedicated monitoring devices is shown in FIG. 2.

The system shown in FIG. 2 additionally differs from the system shown in FIG. 1 in that the bus units are not connected "only" via one bus but via a plurality of buses; and the bus units are equipped not "only" with one communications controller but with a plurality of communications controllers (a number of communications controllers corresponding to the number of buses), each of the communications controllers of a respective bus unit being assigned to a different bus.

It should already be pointed out at this point that the provision of a plurality of monitoring devices for each system component to be monitored also proves advantageous in systems which do not have a plurality of buses and/or whose bus units do not have a plurality of communications controllers.

The system described below and of which only an extract is shown in FIG. 2 contains three bus units, of which, for reasons of clarity, only a single bus unit BU11 is shown, and three buses B1, B2, and B3 that connect the bus units.

Each of the bus units contains a program-controlled unit, three communications controllers and an AND element. In the case of the bus unit BU11 illustrated in FIG. 2, these elements are designated by the reference symbols CORE11 (program-controlled unit), COMM11, COMM12, COMM13 (communications controllers) and AND (AND element).

The communications controllers COMM11, COMM12 and COMM13 have the same construction as the communications controllers COMM1, COMM2 and COMM3 used in the system according to FIG. 1; elements designated by the same reference symbols correspond to the same or mutually corresponding elements.

Of the communications controllers provided in the bus units,
  in each case one communications controller, more precisely its terminals IN2, IN3, OUT1 and IO, is connected to the first BUS B1,
  in each case one communications controller, more precisely its terminals IN2, IN3, OUT1 and IO, is connected to the second BUS B2,
  in each case one communications controller, more precisely its terminals IN2, IN3, OUT1 and IO, is connected to the third BUS B3.

The input terminals IN1 of the respective communications controllers are connected to the program-controlled units provided in the relevant bus units.

The output terminals OUT1 of the respective communications controllers are connected to the input terminals of the AND element AND of the relevant bus unit.

The output terminals of the AND elements AND are connected to the program-controlled unit provided in the respective bus unit; via this connection, the program-controlled unit is controlled (activated or left in the activated state or deactivated).

Each of the communications controllers contains a monitoring device.

The monitoring device contained in the first communications controller COMM11 of the bus unit BU11
  receives monitoring data, via the input terminal IN1 from the program-controlled unit CORE11 associated with it, and stores these data in the first storage device S1,
  receives, via the first bus B1 and the input terminal IN2, monitoring data originating from the program-controlled unit to be monitored and belonging to the second bus unit (not shown in FIG. 2) and transmitted by the first communications controller of this bus unit, and stores these data in the second storage device S2,
  receives, via the first bus B1 and the input terminal IN3, monitoring data originating from the program-controlled unit to be monitored and belonging to the third bus unit (not shown in FIG. 2) and transmitted by the first communications controller of this bus unit, and stores these data in the third storage device S3,
  transmits the monitoring data received by it from the program-controlled unit CORE11 associated with it and stored in the first storage device S1, via the output terminal OUT2 and the first bus B1, to the first communications controllers of the second bus unit and the third bus unit,
  checks, by means of the comparison device C, whether the monitoring data stored in the storage devices S1 to S3 meet predefined conditions,
  decides, by means of the decision device D and depending on the result of the comparison carried out by the comparison device, whether the associated program-controlled unit CORE11 can remain in operation or continue to operate or must be deactivated,
  controls the associated program-controlled unit CORE11 via the output terminal OUT1 and the AND element AND in accordance with the decision made by the decision device D,
  transmits the decision made by the decision device D, via the input and output terminal IO and the first bus B1, to the second communications controller COMM2 and to the first communications controllers of the second bus unit and the third bus unit, and
  receives, via the input and output terminal IO, the decisions which have been made by the decision devices D contained in the first communications controllers of the second bus unit and of the third bus unit and are transmitted by the respective communications controllers, via the first bus B1, to the first bus unit BU11.

The monitoring device contained in the second communications controller COMM12
  receives monitoring data, via the input terminal IN1 from the program-controlled unit CORE11 associated with it, and stores these data in the first storage device S1,
  receives, via the second bus B2 and the input terminal IN2, monitoring data originating from the program-controlled unit to be monitored and belonging to the second bus unit and transmitted by the second communications controller of this bus unit, and stores these data in the second storage device S2,
  receives, via the second bus B2 and the input terminal IN3, monitoring data originating from the program-controlled unit to be monitored and belonging to the third bus unit and transmitted by the second communications controller of this bus unit, and stores these data in the third storage device S3,
  transmits the monitoring data received by it from the program-controlled unit CORE11 associated with it and stored in the first storage device S1, via the output terminal OUT2 and the second bus B2, to the second communications controllers of the second bus unit and the third bus unit,
  checks, by means of the comparison device C, whether the monitoring data stored in the storage devices S1 to S3 meet predefined conditions,
  decides, by means of the decision device D and depending on the result of the comparison carried out by the comparison device, whether the associated program-controlled unit CORE11 can remain in operation or continue to operate or must be deactivated,
  controls the associated program-controlled unit CORE11 via the output terminal OUT1 and the AND element AND in accordance with the decision made by the decision device D,
  transmits the decision made by the decision device D, via the input and output terminal IO and the second bus B2 to the second communications controllers of the second bus unit and of the third bus unit, and
  receives, via the input and output terminal IO, the decisions which have been made by the decision devices D contained in the second communications controllers of the second bus unit and of the third bus unit and are transmitted by the respective communications controllers, via the second bus B2, to the first bus unit BU11.

The monitoring device contained in the third communications controller COMM13
  receives monitoring data, via the input terminal IN1 from the program-controlled unit CORE11 associated with it, and stores these data in the first storage device S1, receives, via the third bus B3 and the input terminal IN2, monitoring data originating from the program-controlled unit to be monitored and belonging to the second bus unit and transmitted by the third communications controller of this bus unit, and stores these data in the second storage device S2, receives, via the third bus B3 and the input terminal IN3, monitoring data originating from the program-controlled unit to be monitored and belonging to the third bus unit and transmitted by the third communications controller of this bus unit, and stores these data in the third storage device S3, transmits the monitoring data received by it from the (third) program-controlled unit CORE11 associated with it and stored in the first storage device S1, via the output terminal OUT2 and the third bus B3, to the third communications controllers of the second bus unit and the third bus unit, checks, by means of the comparison device C, whether the monitoring data stored in the storage devices S1 to S3 meet predefined conditions, decides, by means of the decision device D and depending on the result of the comparison carried out by the comparison device, whether the associated program-controlled unit CORE11 can remain in operation or continue to operate or must be deactivated, controls the associated program-controlled unit CORE11 via the output terminal OUT1 and the AND element AND in accordance with the decision made by the decision device D, transmits the decision made by the decision device D, via the input and output terminal IO and the third bus B3, to the third communications controllers of the second bus unit and of the third bus unit, and receives, via the input and output terminal IO, the decisions which have been made by the decision devices D contained in the third communications controllers of the second bus unit and of the third bus unit and are transmitted by the respective communications controllers, via the third bus B3, to the first bus unit BU11.

It should be clear that the arrangements described can be modified in many ways. In particular there is no restriction that the system components to be monitored are a constituent part of an anti-lock braking system (the system components to be monitored can also be a constituent part of any other desired systems), that the system components to be monitored have an identical construction and are operated identically (it is also possible for system components to be monitored in the manner described which have a different construction and/or are operated differently and "only" carry out the same or mutually corresponding actions), that the system components to be monitored supply the same monitoring data (it is also possible for system components to be monitored in the manner described which "only" supply mutually corresponding monitoring data or monitoring data which are in a specific ratio or a specific relationship), that the system components to be monitored are program-controlled units (any other desired system components can also be monitored in the manner described), that the system components to be monitored and/or the monitoring devices associated with them are connected to one another via one or more buses (the system components to be monitored and the monitoring devices associated with them can be provided at any desired locations in the system and can be connected to one another in any desired manner), that the system components to be monitored and/or the monitoring devices associated with them, if connected via a plurality of buses, are connected to one another via three buses (the system components to be monitored and the monitoring devices associated with them can be connected to one another via any desired number of buses), and that the monitoring devices are a constituent part of communications controllers (the monitoring devices can also be a constituent part of other devices or separate devices).

In following the above description, irrespective of the details of the practical implementation, it is possible, under all circumstances, to detect reliably whether, and if appropriate, which of the system components to be monitored is operating in a faulty manner.

I claim:

1. An electrical system, comprising:
a plurality of system components carrying out the same or mutually corresponding actions; and
an apparatus for monitoring a proper operation of said plurality of components of the electrical system, said apparatus including:
a plurality of dedicated monitoring devices each assigned to a respective one of said system components to be monitored, each of said dedicated monitoring devices being operable independently of the respective system component to be monitored;
said monitoring devices being connected to receive monitoring data from the respectively associated system component and being configured to compare monitoring data received from the respectively associated system component and from other system components or from other monitoring devices, for determining whether or not the respectively associated system component is operating properly.

2. The electrical system according to claim 1, wherein said monitoring devices are configured to examine the monitoring data received from the system components and to decide whether the monitoring data meet predefined conditions.

3. The electrical system according to claim 2, wherein, if a given said monitoring device concludes that the monitoring data from one of the system components do not meet the predefined condition, the relevant system component is made to stop operating.

4. The electrical system according to claim 3, wherein said monitoring device is configured to stop an operation of the relevant system component.

5. The electrical system according to claim 4, wherein the system components to be monitored are constructed and operated to only process a given task when an enable signal is present.

6. The electrical system according to claim 5, wherein said monitoring device is configured to generated the enable signal for the respectively associated system component.

7. The electrical system according to claim 5, wherein the enable signal is formed by a logical combination of control signals generated and output by the monitoring devices associated with a respective system component depending on whether or not the monitoring data output by the system component meet the predefined conditions.

8. The electrical system according to claim 2, wherein said monitoring devices are configured to check whether the monitoring data received from the system components to be monitored and/or from the monitoring devices associated therewith agree or correspond to one another.

9. The electrical system according to claim 2, wherein said monitoring devices are configured to check whether the monitoring data received from the system components to be monitored and/or from the monitoring devices associated therewith are in a predetermined ratio or a predetermined relationship with one another.

10. The electrical system according to claim 2, wherein said monitoring devices are configured to check whether the monitoring data received from the system components to be monitored and/or from the monitoring devices associated therewith are predetermined data.

11. The electrical system according to claim 1, wherein the system components to be monitored are a constituent part of various bus units of a bus system.

12. The electrical system according to claim 11, wherein the bus units containing the system components to be monitored are connected to one another via a plurality of buses.

13. The electrical system according to claim 12, wherein the bus units contain a number of communications controllers corresponding to a number of buses connecting the communications controllers to one another, wherein each communications controller is connected to a different bus.

14. The electrical system according to claim 13, wherein a monitoring device is provided in each of the communications controllers.

15. The electrical system according to claim 11, wherein said monitoring devices are a constituent part of communications controllers of the bus units, and the communications controllers are configured to transmit data to other bus units via the bus, and to receive data via the bus.

16. The electrical system according to claim 15, wherein the bus units containing the system components to be monitored are connected to one another via a plurality of buses.

17. The electrical system according to claim 1, wherein the system components to be monitored are program-controlled units.

* * * * *